United States Patent [19]

Short et al.

[11] Patent Number: 5,708,814

[45] Date of Patent: Jan. 13, 1998

[54] METHOD AND APPARATUS FOR REDUCING THE RATE OF INTERRUPTS BY GENERATING A SINGLE INTERRUPT FOR A GROUP OF EVENTS

[75] Inventors: Robert T. Short, Kirkland; John M. Parchem, Seattle; David N. Cutler, Bellevue, all of Wash.

[73] Assignee: Microsoft Corporation, Redmond, Wash.

[21] Appl. No.: 561,104

[22] Filed: Nov. 21, 1995

[51] Int. Cl.[6] .................................................. G06F 13/00
[52] U.S. Cl. ........................................................... 395/733
[58] Field of Search ...................................... 395/733–742

[56] References Cited

U.S. PATENT DOCUMENTS

| | | | |
|---|---|---|---|
| 3,789,365 | 1/1974 | Jen et al. | 395/737 |
| 5,265,255 | 11/1993 | Bonevento et al. | 395/733 |
| 5,319,752 | 6/1994 | Petersen et al. | 395/250 |
| 5,325,536 | 6/1994 | Chang et al. | 395/736 |
| 5,414,858 | 5/1995 | Hoffman et al. | 395/868 |
| 5,440,690 | 8/1995 | Rege et al. | 395/200.02 |
| 5,481,724 | 1/1996 | Heimsoth et al. | 395/200.01 |
| 5,542,076 | 7/1996 | Benson et al. | 395/733 |
| 5,613,129 | 3/1997 | Walsh | 395/740 |

*Primary Examiner*—Jack B. Harvey
*Assistant Examiner*—Sumati Lefkowitz
*Attorney, Agent, or Firm*—Klarquist Sparkman Campbell Leigh & Whinston, LLP

[57] ABSTRACT

A peripheral device interrupt controller maintains a count of pending interrupt events for a peripheral device up to a preset limit and times a preset delay interval from a first pending interrupt event or last interrupt servicing before asserting an interrupt request. When the interrupt request is asserted, the then pending interrupt events can be serviced as a group by a central processing unit of a computer. The overhead of processing a separate interrupt request for each interrupt event is thus avoided. The preset limit and preset delay interval can be set under software control to control the rate at which interrupt requests can be asserted by the peripheral device.

11 Claims, 3 Drawing Sheets

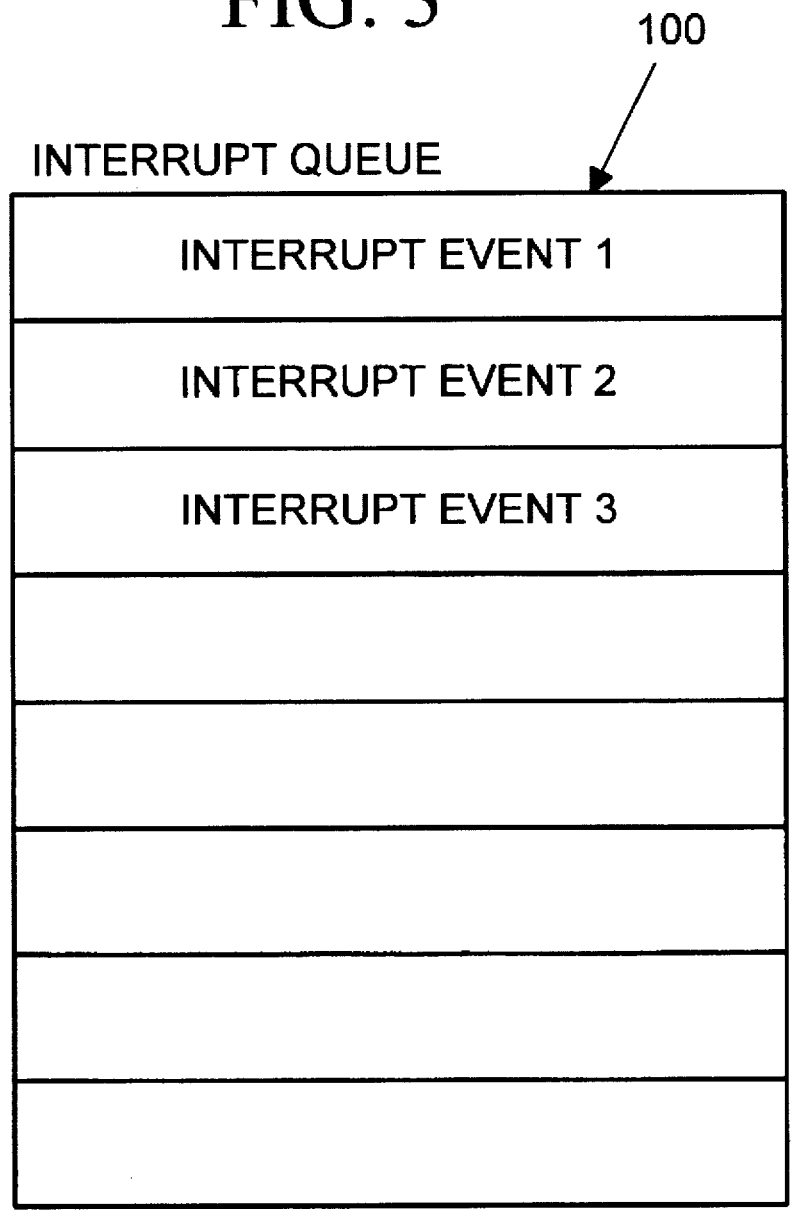

METHOD AND APPARATUS FOR REDUCING THE RATE OF INTERRUPTS BY GENERATING A SINGLE INTERRUPT FOR A GROUP OF EVENTS

FIELD OF THE INVENTION

This invention relates generally to servicing peripheral device input/output, and more particularly relates to processing peripheral device interrupts.

BACKGROUND AND SUMMARY OF THE INVENTION

Computer systems generally consist of a central processing unit (CPU) and one or more peripheral devices such as disk or network controllers. The peripheral devices typically include hardware for notifying the CPU that some activity (e.g., a data input/output operation) has been completed. This notification usually is made using a hardware interrupt mechanism. A hardware interrupt operates by re-directing instruction processing by the CPU to an interrupt service routine (ISR) specific to the peripheral device that asserted the interrupt. The ISR contains instructions for the CPU to retrieve notifications from the device, such as by reading an input/output port associated with the device.

Before it can start processing the ISR, the CPU must first save the execution state of the currently executing task. When the CPU completes processing the ISR, the CPU can then restore that execution state and resume processing the task. This saving and restoring of the CPU's current execution state adds a small, but finite time to the processing of each interrupt.

Some peripheral devices, network devices in particular, exhibit extremely bursty behavior. This means that while the device may assert relatively few interrupts in one period of time, the device may assert many hundreds of interrupts in a following equal time period.

A typical network device asserts an interrupt to the CPU for each individual message or data packet that it receives. If the network device receives a large number of packets in a relatively short period of time, the CPU will spend a very significant amount of time to enter and return from the ISR (due at least in part to saving and restoring the execution state of the currently executing task) for all of the interrupts that the network device will assert for these packets. This time spent by the CPU in repeatedly entering and returning from the ISR does not accomplish any useful work and is simply wasted. Since the CPU could otherwise spend this time to accomplish useful work, the overall processing capacity of the system is reduced.

In accordance with the present invention, a peripheral device interrupt controller controls the rate at which interrupts to the CPU by a peripheral device are generated such that a number of peripheral device operations which otherwise would individually initiate an interrupt are effectively serviced as a "batch" by the CPU with a single interrupt. The controller includes a timer for timing a delay from an earliest pending peripheral device operation, and a counter for counting the number of pending peripheral device operations. When the timer or the counter reach preset limits, the controller generates an interrupt to the CPU. The preset limits may be set by software. On receiving the interrupt, the CPU preferably services all pending peripheral device operations. As a result, multiple peripheral device operations which occur in a burst are processed in a single interrupt by the CPU. This dramatically reduces the interrupt processing overhead of the CPU (i.e., the time spent saving and restoring its current execution state) in a busy system, and thereby increases both the throughput and responsiveness of the system. Further, the rate at which the peripheral devices generate interrupts can be placed under software control.

Additional features and advantages of the invention will be made apparent from the following detailed description of an illustrated embodiment which proceeds with reference to the accompanying drawings.

BRIEF DESCRIPTION OF THE DRAWINGS

FIG. 3 is a block diagram of a queue memory of a peripheral device which is controlled by the interrupt controller of FIG. 2.

DETAILED DESCRIPTION OF THE ILLUSTRATED EMBODIMENTS

Figure 1:
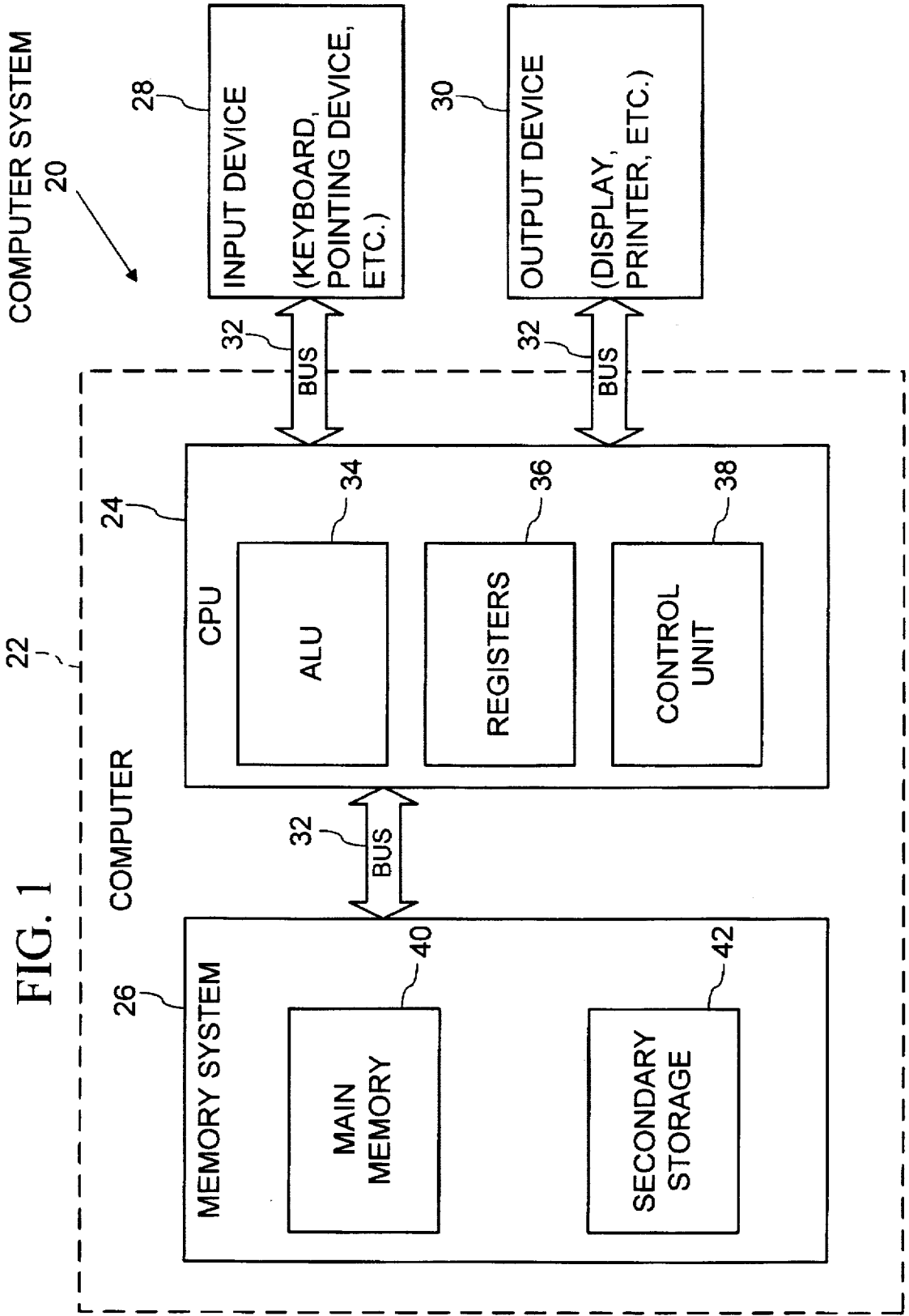
FIG. 1 is a block diagram of a computer system that may be used to implement a method and apparatus embodying the invention.

Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola. The computer 22 can include more than one CPU 24.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g. a microphone), etc. The output device 30 can comprise a display, a printer, a transducer (e.g. a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26. In the illustrated embodiment of the invention, the operating system is Microsoft Corporation's Windows NT operating system software (hereafter "Windows NT"). For a complete discussion of the Windows NT operating system see Inside Windows NT, by Helen Custer, Microsoft Press, 1993. Although illustrated in the context of the Windows NT operation system, the invention also can be used with other operating systems.

In accordance with the practices of persons skilled in the art of computer programming, the present invention is described below with reference to symbolic representations of operations that are performed by the computer system 20. Such operations are sometimes referred to as being computer-executed. It will be appreciated that the operations which are symbolically represented include the manipulation by the CPU 24 of electrical signals representing data bits and the maintenance of data bits at memory locations in the memory system 26, as well as other processing of signals. The memory locations where data bits are maintained are physical locations that have particular electrical, magnetic, or optical properties corresponding to the data bits. The invention can be implemented in a program or programs, comprising a series of instructions stored on a computer-readable medium. The computer-readable medium can be any of the devices, or a combination of the devices, described above in connection with the memory system 26.

Figure 2:
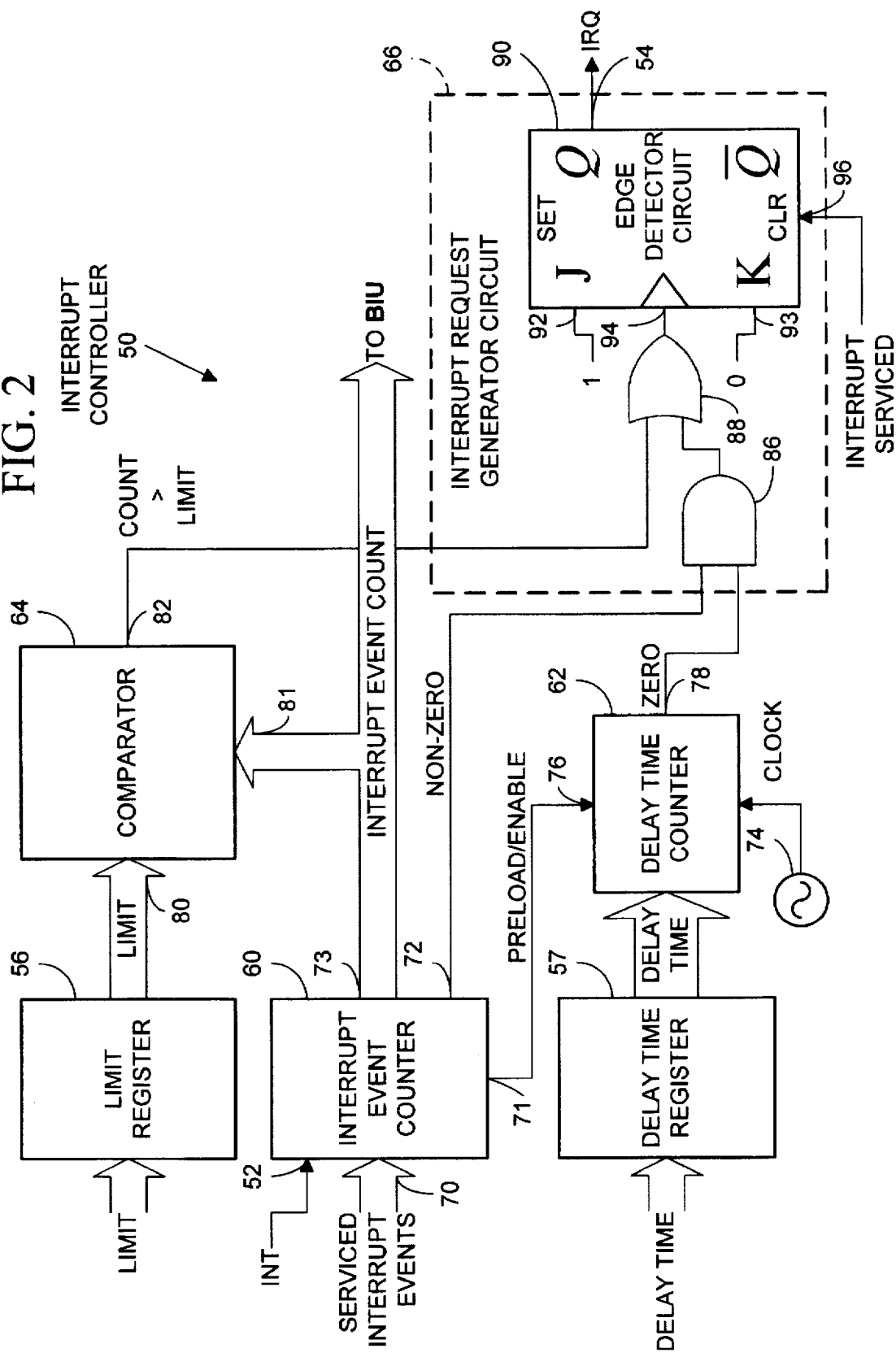
FIG. 2 is a block diagram of a peripheral device interrupt controller according to an illustrated embodiment of the invention for use in a computer system such as shown in FIG. 1.

Referring now to FIG. 2, in an illustrated embodiment of the invention, an interrupt controller 50 is coupled between an interrupt output of a controlled peripheral device (e.g., an input or output device 28, 30 of the computer system 20 of FIG. 1 such as a network adapter card) and an interrupt request (IRQ) input of the CPU 24 (FIG. 1). The interrupt output of the controlled peripheral device is connected at an interrupt event input 52 of the interrupt controller 50. The interrupt controller 50 has an IRQ output 54 which connects to the IRQ input of the CPU 24. The interrupt controller 50 is a hardware circuit which preferably is contained in or on the peripheral device. With a network adapter card for example, the interrupt controller 50 can be implemented as integrated circuits on the adapter card which are connected with or combined with other control circuits on the adapter card. Alternatively, the interrupt controller 50 can be a separately housed device connected between the peripheral device and the computer 22 or integrated with circuitry of the computer 22 such as on the motherboard containing the CPU 24.

The interrupt controller 50 operates to pass an interrupt request to the CPU 24 for the controlled peripheral device when an event requiring an interrupt is pending (hereafter "interrupt event"), but passes only a single interrupt request to the CPU 24 when a number of such interrupt events occur in a short time interval. The rate at which interrupts by the controlled peripheral device are permitted by the interrupt controller 50 is determined by two preset values, a limit and a delay time. The limit value sets a maximum number of pending interrupt events for the controlled peripheral device that the interrupt controller will allow to accumulate before asserting an IRQ to the CPU 24. The delay time value sets a maximum time interval that the interrupt controller will delay from the earliest pending interrupt event of the controlled peripheral device before asserting an IRQ to the CPU 24. In the illustrated embodiment, the interrupt controller 50 comprises a limit register 56 and a delay time register 57 which store the limit and delay time values, respectively.

The limit and delay time values preferably are set by the operating system software of the computer system 20. This software sets the limit and delay time values into the registers 56–57 by writing the values to input/output port addresses which are configured to the controlled peripheral device or the interrupt controller 50 as is known in the art.

The interrupt controller 50 further comprises an interrupt event counter 60, a delay timer 62, a comparator 64, and an interrupt request generator circuit 66 which together operate to assert a single IRQ to the CPU 24 for a set of interrupts of the peripheral device as determined by the limit and delay time values. The interrupt event counter 60 maintains a count of the pending interrupt events of the controlled peripheral device. Whenever an event requiring an interrupt of the CPU 24 occurs, the controlled peripheral device generates an interrupt signal as is conventionally known. This interrupt signal is output by the controlled peripheral device to the interrupt event input 52 of the interrupt controller 50. For each interrupt signal received from the controlled peripheral device at the input 52, the interrupt event counter 60 increments its count of pending interrupt events.

The interrupt event counter 60 later decrements the count of pending interrupt events by the number of interrupt events serviced by the CPU 24. The CPU 24 writes this number to the serviced interrupt events count input 70 of the interrupt event counter 60. The interrupt event counter 60 includes circuitry to ensure that new interrupt events signaled by the controlled peripheral device at the input 52 during such a write of serviced interrupt events by the CPU 24 is included in the count and not lost. In the illustrated embodiment for example, the base clock frequency of the synchronous logic which implements the interrupt event counter 60 is at least twice the frequency at which interrupt events can be generated. The interrupt event counter 60 thus can defer the single interrupt event that may occur while decrementing the interrupt event count by the number of service interrupt events to a following cycle of the interrupt event counter's base clock frequency without losing an interrupt event. The interrupt event counter 60 therefore maintains an accurate count of all pending, unserviced interrupt events.

In the illustrated embodiment, the interrupt event counter 60 further includes circuitry to prevent wrapping of the interrupt event count in the case of an underflow or overflow condition. More specifically, the interrupt event counter 60 maintains the interrupt event count at its maximum value (i.e., all bits of the count are "ones") when the interrupt event count is at the maximum value and an additional interrupt event is signaled by the controlled peripheral device at input 52. Also, the interrupt event counter 60 sets the interrupt event count at zero when the CPU 24 writes a number of serviced interrupt events at input 70 that is greater than the current interrupt event count.

The interrupt event counter 60 also has outputs 71–73 for a preload/enable signal, a non-zero interrupt event count signal, and the interrupt event count, respectively. The preload/enable signal output 71 is connected to the delay timer 62. The non-zero interrupt event count signal output 72 connects to the interrupt request generator circuit 66. The interrupt event count output 73 connects to the comparator 64. As shown in FIG. 2, the interrupt event count output 73 also is connected to a conventional bus interface unit (BIU) of the computer 22 (FIG. 1) which allows the CPU 24 to read in the interrupt event count.

The delay timer 62 times an interval determined by the preset delay time value in the delay time register 57 from the earliest interrupt event still pending or the last interrupt event serviced (whichever is later). This has the effect of both imposing a delay from an earliest interrupt event during which additional interrupt events that occur in a burst with the earliest interrupt event can accumulate and be serviced as a batch, as well as a minimum delay between the CPU 24 servicing interrupt events of the controlled peripheral device and the interrupt controller 50 asserting a next IRQ for the controlled peripheral device.

In the illustrated embodiment, the delay timer 62 is implemented as a counter which is decremented (when enabled) at a fixed frequency of a clock signal applied to the delay timer 62 from a clock circuit or oscillator 74. The delay timer 62 is preloaded with the delay time value from the delay time register 57 and enabled when signaled by the interrupt event counter 60 at a preload/enable input 76. The interrupt event counter 60 signals preloading and enabling of the delay timer 62 on the following two conditions: (1) the interrupt event count is incremented from zero, and (2) the interrupt event count remains non-zero following subtraction of a serviced interrupt events number written by the CPU 24 at input 70. When the count in the delay timer 62 reaches zero, the delay timer 62 signals a zero condition to the interrupt request generator circuit 66 at an output 78. The count in the delay timer 62 remains at zero until preloading/ enabling of the delay timer 62 is again signaled by the interrupt event counter 52.

The comparator 64 detects when the interrupt event count exceeds the preset limit value. The comparator 64 has inputs 80–81 for receiving the interrupt event count from the interrupt event counter 60 and the preset limit value from the limit register 56. When the interrupt event count exceeds the preset limit value, the comparator 64 signals this condition to the interrupt request generator circuit 66 at an output 82.

The interrupt request generator circuit 66 asserts an IRQ at the output 54 to the CPU 24 when either of the following conditions are met: (1) the count in the delay timer 62 reaches zero and the interrupt event count is non-zero, or (2) the interrupt event count exceeds the preset limit value. In the illustrated embodiment, the interrupt request generator circuit 66 comprises an AND gate 86, an OR gate 88, and an edge detector circuit 90. The AND gate 86 and OR gate 88 are logic circuits that determine whether the conditions for asserting an IRQ have been met. The edge detector circuit 90 operates to ensure that exactly one IRQ is asserted when the conditions are met, and no further IRQs are asserted until the operating system software specifically reenables further IRQs by writing the number of serviced interrupt events to the input 70 of the interrupt event counter 60. In the illustrated embodiment, the edge detector circuit 90 is implemented as a J-K flip-flop circuit having a J input 92 tied to a "one" logic level voltage, a K input 93 tied to a "zero" logic level voltage, and a clock input 94 connected to the output of the logic gates 86, 88. The operating system software clears the IRQ at the output 54 by sending a clear signal to an input 96 of the edge detector circuit 90, such as by writing to an input/output port.

Referring to FIG. 3, the controlled peripheral device preferably has access to a queue memory 100 (also referred to as the "interrupt queue") for storing data of the pending interrupt events while awaiting processing by the CPU 24 as is known in the art. In the case of a network adapter card for example, the interrupt events may include notifications to the CPU 24 that data packets addressed to the computer 22 have been received over a network connection, or that data packets have been successfully sent by the network adapter for the computer 22. The queue memory 100 of the network adapter therefore may store any such received data packets and notifications for processing by the CPU 24.

In operation, the controlled peripheral device stores data for each interrupt event in its queue memory 100 and signals an interrupt to the interrupt controller 50. On receiving a first such interrupt, the interrupt controller 50 increments its interrupt event count in the interrupt event counter 60 to one and initiates timing of the delay interval by the delay timer 62. Additional interrupts occurring in the delay interval further increment the interrupt event count in the interrupt event counter 60. The comparator 64 checks for the interrupt event count exceeding the preset limit. When the delay interval expires or the interrupt event count exceeds the preset limit, the interrupt request generator circuit 66 asserts an IRQ to the CPU On receiving the IRQ of the interrupt controller 50, the CPU 24 transfers processing to an ISR specific to the controlled peripheral device (and saves the execution state of the currently executing process). In Windows NT which is utilized in the illustrated embodiment of the invention, the ISR for the controlled peripheral device is provided in a device driver for the controlled peripheral device. Windows NT device drivers generally employ two-level interrupt processing to allow prompter servicing of other, intermediate priority devices. (This is discussed in greater detail in chapter 8, pages 260–265 of the Inside Windows NT text referenced above.) The ISR contains code to remove or clear the IRQ immediately by executing a write operation which causes a clear signal to be applied at the input 96 of the interrupt request generator circuit 66. The ISR, however, does not itself process the pending interrupt events. Instead, the ISR queues a deferred procedure call (DPC) provided in the controlled peripheral device's device driver which contains the code for processing the pending interrupt events. This DPC eventually gets scheduled for execution by the Windows NT task scheduler, but in the meantime may be preempted by a higher priority task such as an interrupt request from an intermediate priority device.

Upon execution, the DPC processes or services all pending interrupt events which are then queued in the controlled peripheral device's queue memory 100. When this processing is complete, the DPC writes the number of interrupt events that it serviced to the interrupt controller 50 at input 70. As discussed above, although the ISR clears the IRQ before the DPC services the pending interrupt events, the interrupt controller 50 cannot assert another IRQ until after the DPC writes this number at the input 70. The interrupt event counter subtracts the number written by the DPC from the pending interrupt event count. The interrupt controller 50 then repeats the process of timing the delay interval and monitoring the number of pending interrupt events for a next interrupt request.

Although the DPC preferably services all pending interrupt events, additional interrupt events may occur between the time that the DPC services pending interrupt events and when the DPC writes the number of serviced interrupt events to the interrupt controller 50. These interrupt events are stored in the controlled peripheral device's queue memory 100 and cause the interrupt event counter 60 to increment the pending interrupt event count. However, in the illustrated embodiment, these interrupt events do not start timing of the delay interval by the delay timer 62. As discussed above, the interrupt event counter 60 only signals preloading and enabling of the delay timer 62 when the interrupt event count transitions from zero to one or the interrupt event count remains non-zero after subtracting the number of serviced interrupt events. Accordingly, the delay timer 62 operates to time a minimum delay interval between when interrupt events of the controlled peripheral device are last serviced and when to next assert an IRQ to the CPU 24. The interrupt controller 50 in the illustrated embodiment only asserts an IRQ before this minimum delay interval expires if the number of pending interrupt events exceeds the preset limit.

As a result of this operation, interrupt events of the controlled peripheral device are grouped and a single IRQ is asserted to cause the CPU 24 to service the interrupt events as a batch. This avoids the wasted overhead of the CPU 24 processing a separate IRQ for each interrupt event.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus or operating system software, unless indicated otherwise. Various types of general purpose or specialized computer apparatus may be used with or perform operations in accordance with the teachings described herein. Elements of the illustrated embodiment shown in software may be implemented in hardware and vice versa. For example, the interrupt controller 50 in alternative embodiments of the invention can be implemented in microcode or a software program executed in a controller of the controlled peripheral device. Further, the discrete circuit components of the illustrated embodiment can alternatively be implemented in a single integrated circuit device.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a computer system having a central processor and a peripheral device, a method of interrupting the central processor to process interrupt events of the peripheral device, comprising the steps of:

accumulating a count of pending interrupt events of the peripheral device;

timing a delay interval from a first pending interrupt event of the peripheral device, the delay interval being greater than a minimum period between interrupt events of the peripheral device;

comparing the count to a preset limit to produce at least first and second comparison results, the first comparison result indicating the count has achieved a relationship to the preset limit, the second comparison result indicating the count has not yet achieved said relationship, the second comparison result being produced when the count is of one pending interrupt event; and sending an interrupt request to the central processor on an earlier occurring one out of an expiration of the delay interval and the comparison producing the first comparison result;

whereby the central processor can process the interrupt events of the peripheral device that are pending when the interrupt request is sent as a group.

2. The method of claim 1 wherein the first comparison result is indicative of the count exceeding the preset limit.

3. The method of claim 1 further comprising the step of selecting a desired value of the preset limit.

4. A computer-readable medium having computer-executable instructions for performing the steps recited in claim 1.

5. A peripheral device interrupt controller comprising:

a timer for timing a delay interval that is greater than a minimum period between interrupt events of a peripheral device controlled by the peripheral device controller;

a first timer controller for starting the timing of the delay interval by the timer on a first interrupt event of the controlled peripheral device; and an interrupt event counter for accumulating a count of pending interrupt events of the controlled peripheral device;

a comparator for comparing the count to a limit and determining whether a comparison condition exists, the comparison condition indicating that the count has achieved a relationship to the limit, and the comparison condition excluding instances when the count is of one pending interrupt event;

an interrupt request generator for asserting an interrupt request to a central processor of a computer on expiration of the delay interval to thereby allow at least some of any additional interrupt events of the controlled peripheral device that occur within the delay interval to be processed with the first interrupt event as a group by the central processor; and the interrupt request generator for additionally asserting an interrupt request to a central processor of a computer when the comparison condition exists to thereby cause the central processor to service at least some of the pending interrupt events of the controlled peripheral device as a group.

6. The peripheral device interrupt controller of claim 5 comprising:

a second timer controller for starting the timing of the delay interval by the timer when at least one interrupt event of the controlled peripheral device is pending on completion of servicing of a group of pending interrupt events of the controlled peripheral device by the central processor.

7. The peripheral device interrupt controller of claim 5 wherein the comparison condition includes the count exceeding the limit.

8. The peripheral device interrupt controller of claim 5 comprising:

means for setting a value of the limit under software control.

9. The peripheral device interrupt controller of claim 8 comprising:

a register writeable by software for storing a value determinative of the limit.

10. In a computer system having a central processor and a peripheral device, a method of interrupting the central processor to process interrupt events of the peripheral device, comprising the steps of:

setting a limit value and a delay time value by software executing on the central processor;

incrementing a count for each interrupt event of the peripheral device;

subtracting for each group of interrupt events serviced by the central processor a number of the serviced interrupt events from the count;

initiating timing of a time interval related to the delay time value for each time the count is incremented from zero to one and each time the step of subtracting yields a count greater than zero, the time interval being greater than a minimum period between interrupt events of the peripheral device;

detecting when the count exceeds a limit related to the limit value, the limit being greater than zero; and sending an interrupt request to the central processor on an earlier occurring one out of an expiration of the time interval and the count exceeding the limit whereby the central processor is able to process in response to the interrupt request a group of interrupt events of the peripheral device that are pending on receipt of the interrupt request.

11. A computer-readable medium having computer-executable instructions for performing the steps recited in claim 10.

* * * * *